United States Patent
Sant et al.

(10) Patent No.: US 11,652,725 B2
(45) Date of Patent: *May 16, 2023

(54) PERFORMANCE TESTING OF A TEST APPLICATION IN A NETWORK-AS-A-SERVICE ENVIRONMENT

(71) Applicant: RAKUTEN MOBILE, INC., Tokyo (JP)

(72) Inventors: Mayank Sant, Tokyo (JP); Rahul Atri, Singapore (SG); Kunal Khanwilkar, Singapore (SG); Eswara Reddy Kotha, Tokyo (JP); Phuong Thanh Bui, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/457,940

(22) Filed: Dec. 7, 2021

(65) Prior Publication Data

US 2022/0337501 A1 Oct. 20, 2022

Related U.S. Application Data

(60) Provisional application No. 63/176,363, filed on Apr. 19, 2021.

(51) Int. Cl.
*H04L 43/50* (2022.01)
*H04L 43/0823* (2022.01)

(52) U.S. Cl.
CPC .......... *H04L 43/50* (2013.01); *H04L 43/0823* (2013.01)

(58) Field of Classification Search
CPC ... H04L 41/5054; H04L 43/067; H04L 43/50; H04L 43/0823
See application file for complete search history.

(56) References Cited

U.S. PATENT DOCUMENTS

| | | | |
|---|---|---|---|
| 2006/0205398 A1* | 9/2006 | Seckendorf .......... | G06Q 10/063 455/418 |
| 2009/0185500 A1* | 7/2009 | Mower ................... | H04L 43/50 370/254 |

(Continued)

OTHER PUBLICATIONS

International Search Report dated Mar. 3, 2022, issued in International Application No. PCT/US2021/063041.

(Continued)

*Primary Examiner* — Philip C Lee
(74) *Attorney, Agent, or Firm* — Sughrue Mion, PLLC

(57) ABSTRACT

A method and/or system may receive a test application to be tested on a wireless communication network. The method and/or system may obtain a test design for the test application. The test design may include at least one performance parameter. The method and/or system may define at least one slice of the wireless communication network to test the test application based on the test design. The at least one slice of the wireless communication network may include at least one test wireless network service (e.g. a radio access network). The method and/or system may perform at least one performance test on the at least one slice of the wireless communication network for the test application based on the at least one performance parameter. By designating performance parameters in test designs, the testing may be optimally effective, efficient, and practical.

20 Claims, 17 Drawing Sheets

(56) References Cited

U.S. PATENT DOCUMENTS

| | | | |
|---|---|---|---|
| 2009/0209250 A1* | 8/2009 | Huq | H04L 43/50 455/425 |
| 2009/0319247 A1* | 12/2009 | Ratcliffe, III | G06F 21/577 434/350 |
| 2010/0075678 A1* | 3/2010 | Akman | H04L 43/50 455/67.11 |
| 2014/0281664 A1* | 9/2014 | Dudai | G06F 11/0793 714/3 |
| 2016/0105811 A1* | 4/2016 | Khurana | H04W 4/02 370/252 |
| 2016/0191349 A1* | 6/2016 | Buege | H04L 41/5067 709/224 |
| 2017/0111844 A1* | 4/2017 | Routt | H04W 40/12 |
| 2017/0373962 A1* | 12/2017 | Keeley | H04L 43/0888 |
| 2018/0048527 A1* | 2/2018 | Ganjam | H04L 41/5067 |
| 2018/0206136 A1* | 7/2018 | Chow | H04L 43/0876 |
| 2020/0081825 A1* | 3/2020 | Parbhane | G06F 11/3664 |
| 2020/0394554 A1* | 12/2020 | Gautam | H04B 10/80 |
| 2020/0412612 A1* | 12/2020 | Cherunni | H04L 41/40 |
| 2021/0271506 A1* | 9/2021 | Ganguly | H04L 67/34 |
| 2022/0023755 A1* | 1/2022 | Vukojevic | H04L 67/63 |

OTHER PUBLICATIONS

Written Opinion dated Mar. 3, 2022, issued in International Application No. PCT/US2021/063041.

* cited by examiner

PERFORMANCE TESTING OF A TEST APPLICATION IN A NETWORK-AS-A-SERVICE ENVIRONMENT

BACKGROUND

Wireless communication networks are continuously evolving. As bandwidth and other features are enhanced, there are increasingly more applications that can be implemented on a wireless communication network. For example, smartphones which operate on a wireless communication network run a virtually unlimited number of applications, for the benefit of the end users. Developers of these applications (e.g. vendors) are in regular need to test their developed applications on wireless communication networks, before their applications can be offered to consumers. However, since wireless communications networks are so complex, it can be challenging for these developers to be able to effectively, efficiently, and practically test their applications on wireless communication networks. In particular, it can be challenging for developers to test the specific performance of their applications on wireless communication networks.

SUMMARY

Embodiments relate to a method and/or system. The method and/or system may receive a test application to be tested on a wireless communication network. The method and/or system may obtain a test design for the test application. The test design may include at least one performance parameter. The method and/or system may define at least one slice of the wireless communication network to test the test application based on the test design. The at least one slice of the wireless communication network may include at least one test wireless network service (e.g. a radio access network). The method and/or system may perform at least one performance test on the at least one slice of the wireless communication network for the test application based on the at least one performance parameter. By designating performance parameters in test designs, the testing may be optimally effective, efficient, and practical.

DRAWINGS

Figure 1:
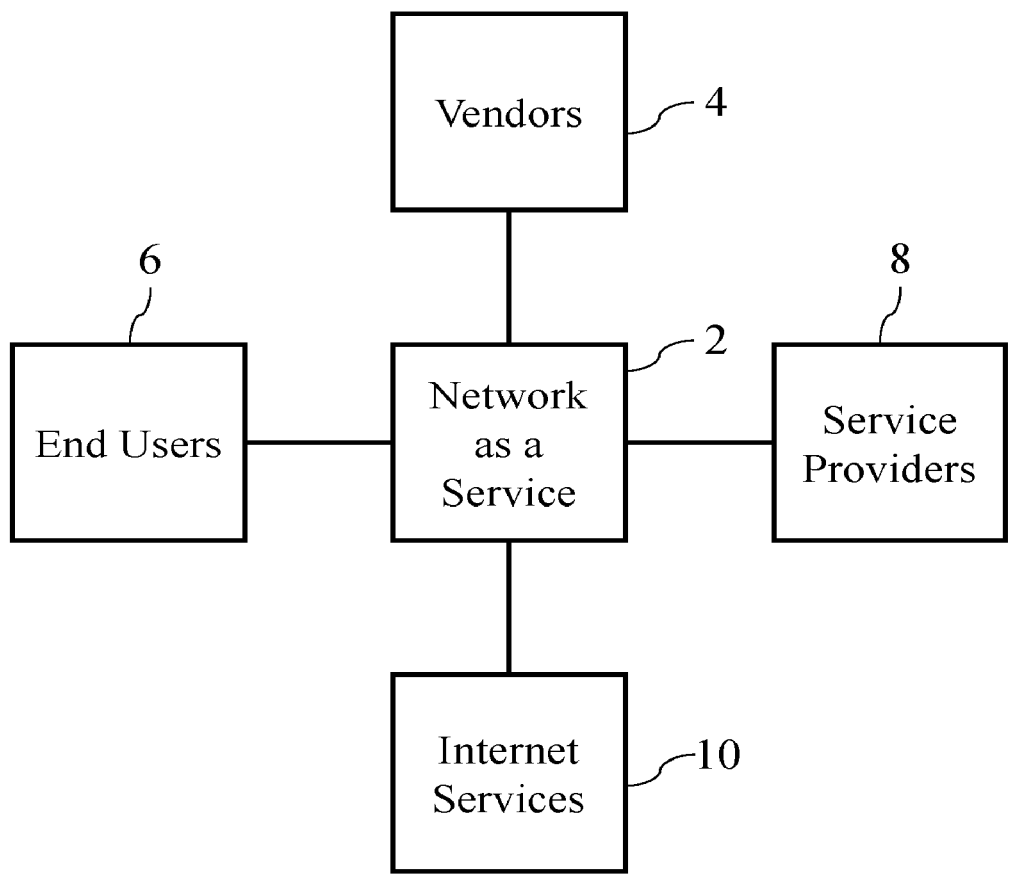

Example FIG. 1 illustrates a general network-as-a-service environment, in accordance with embodiments.

Figure 2:
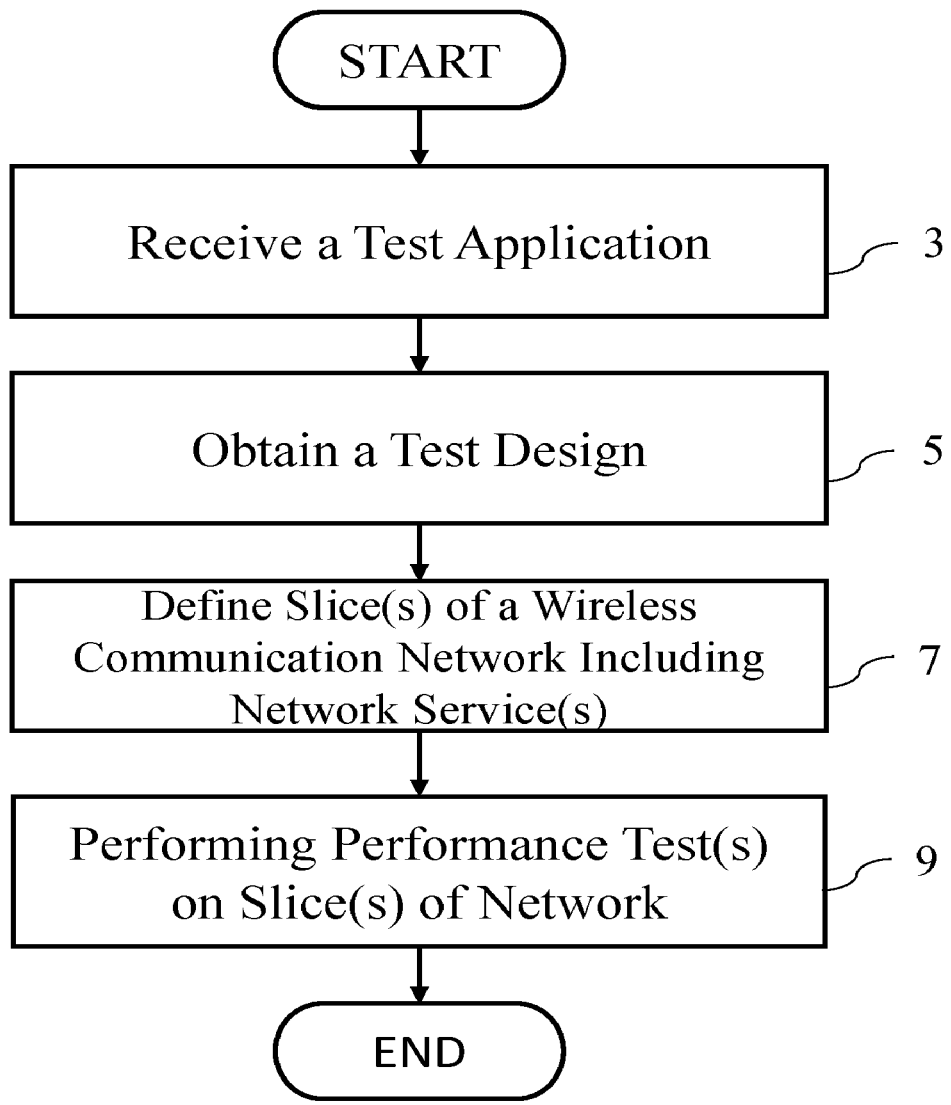

Example FIG. 2 illustrates a process of testing a test application in a network-as-a-service environment based on at least one performance parameter, in accordance with embodiments.

Figure 3:
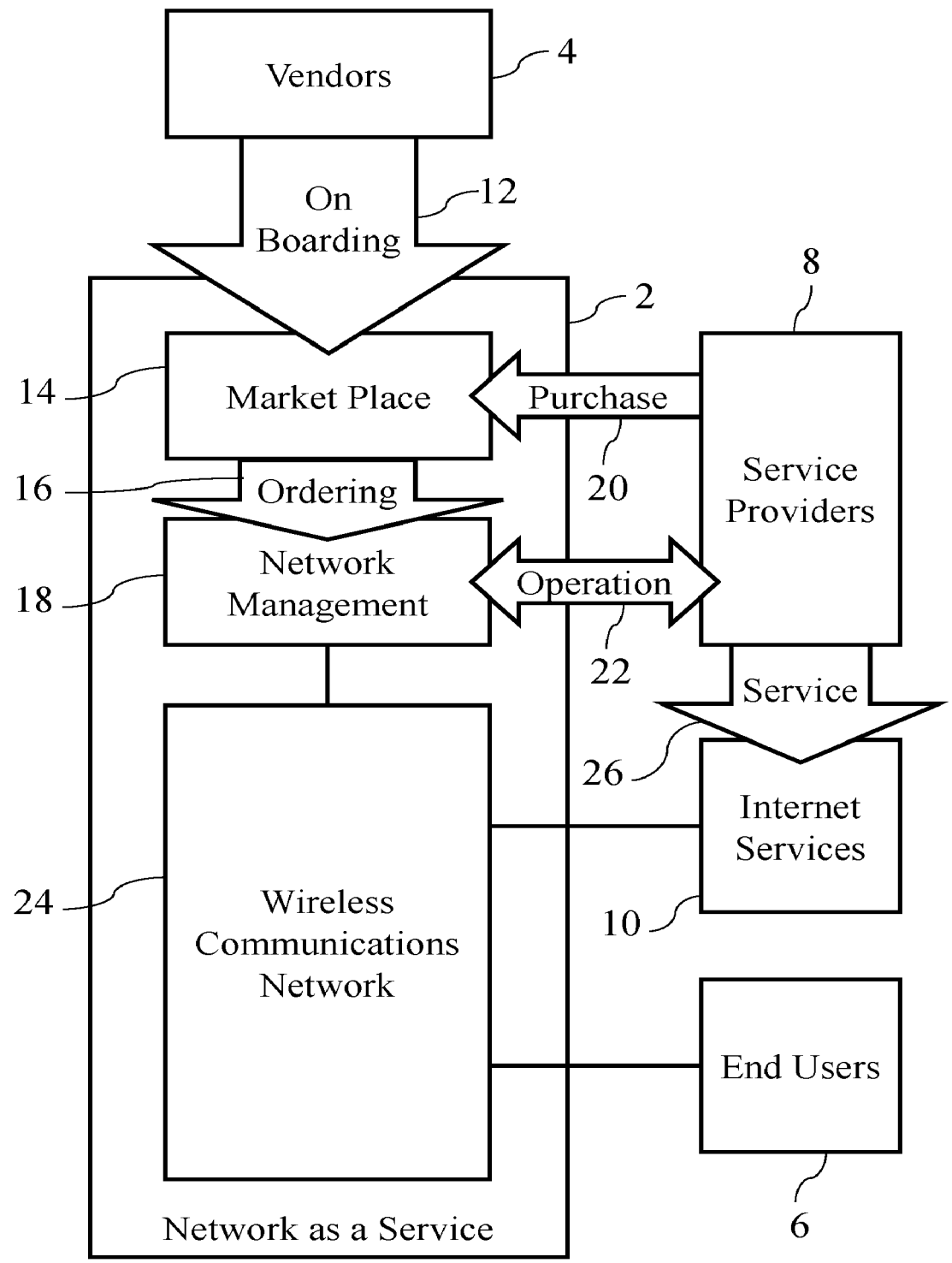

Example FIG. 3 illustrates configurations and interactions of components in a network-as-a-service environment, in accordance with embodiments.

Figure 4:
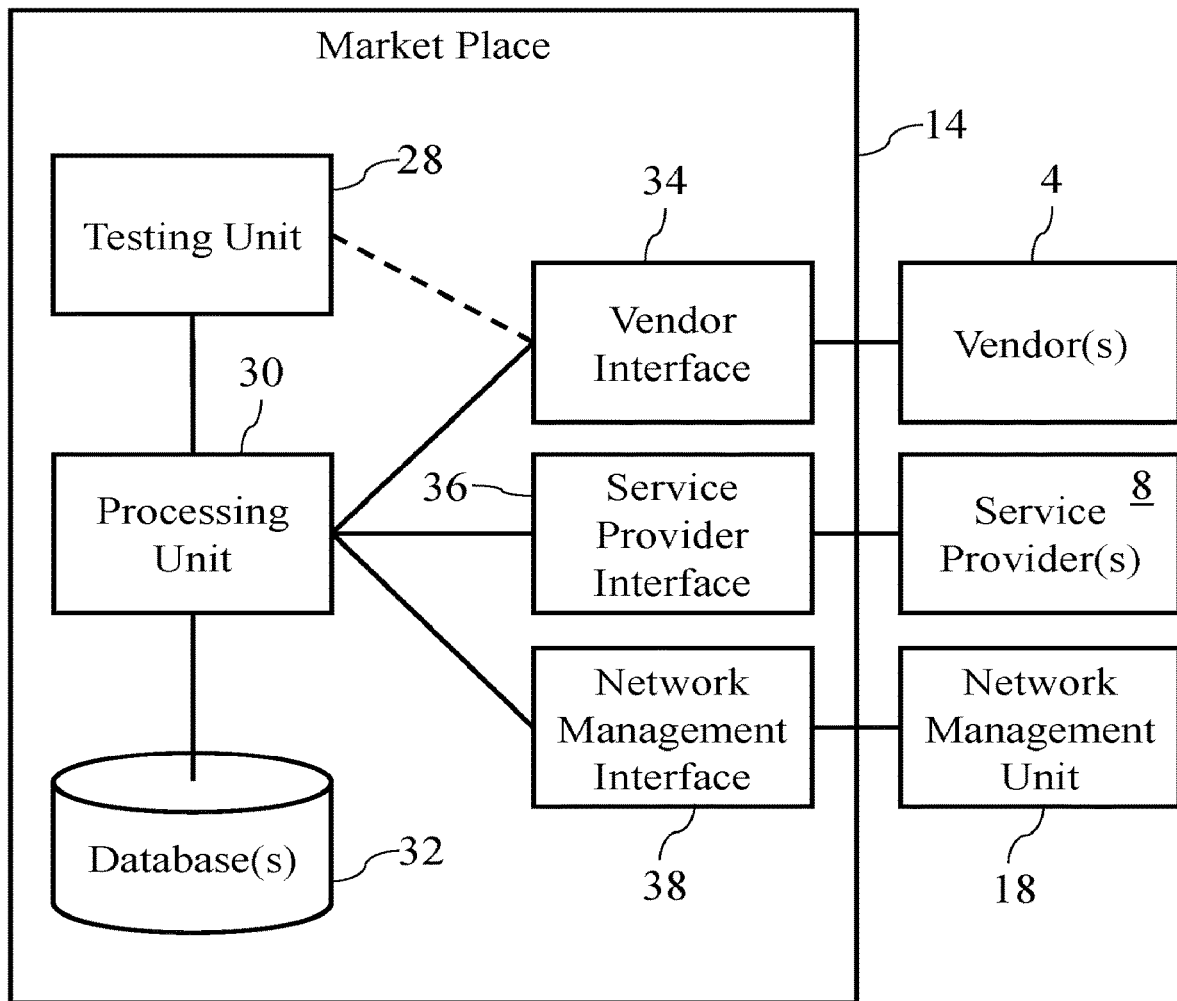

Example FIG. 4 illustrates configurations and interactions at a market place component of a network-as-a-service environment, in accordance with embodiments.

Figure 5:
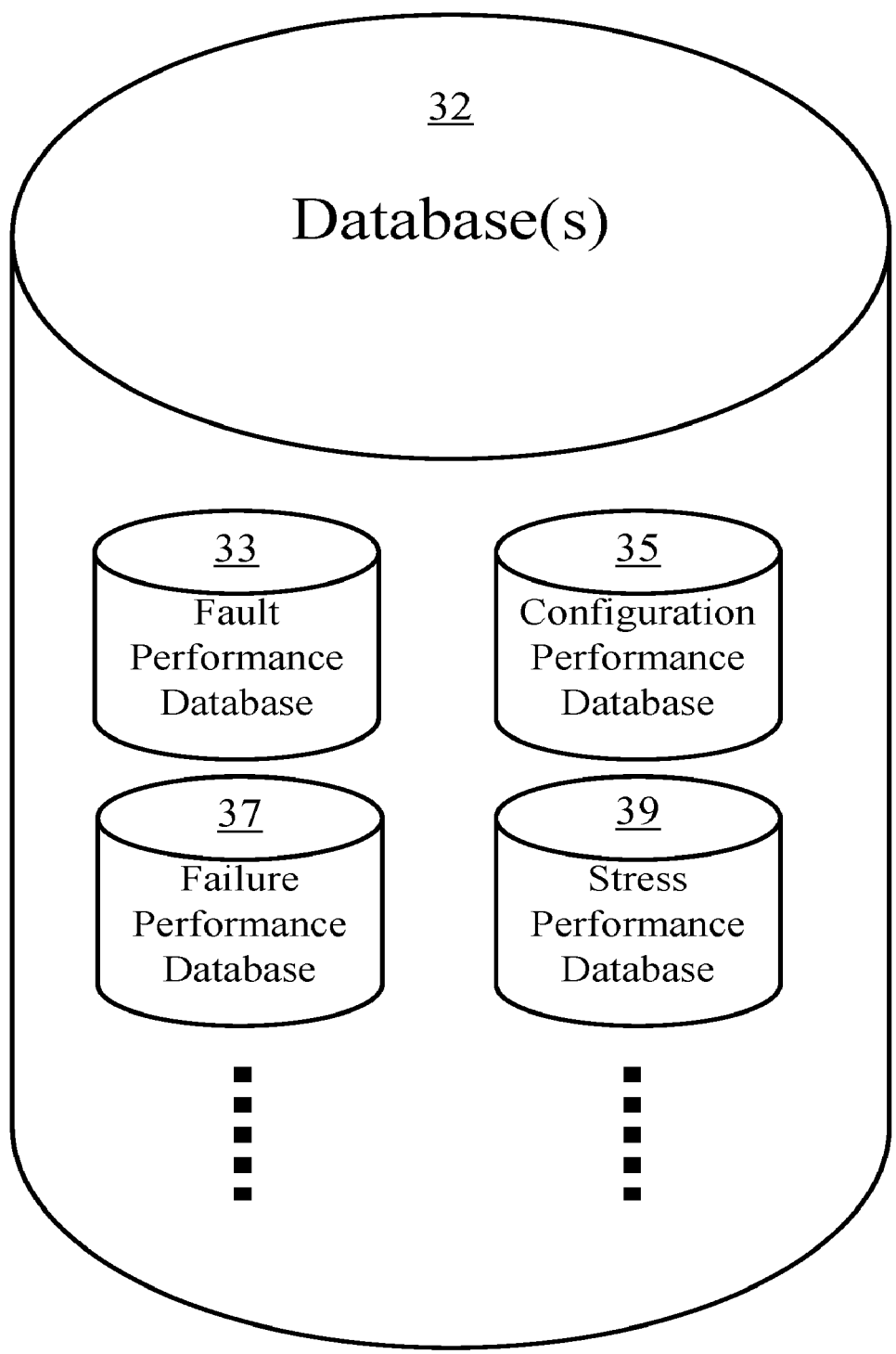

Example FIG. 5 illustrates database(s) included in a network-as-a-service, in accordance with embodiments.

Figure 6:
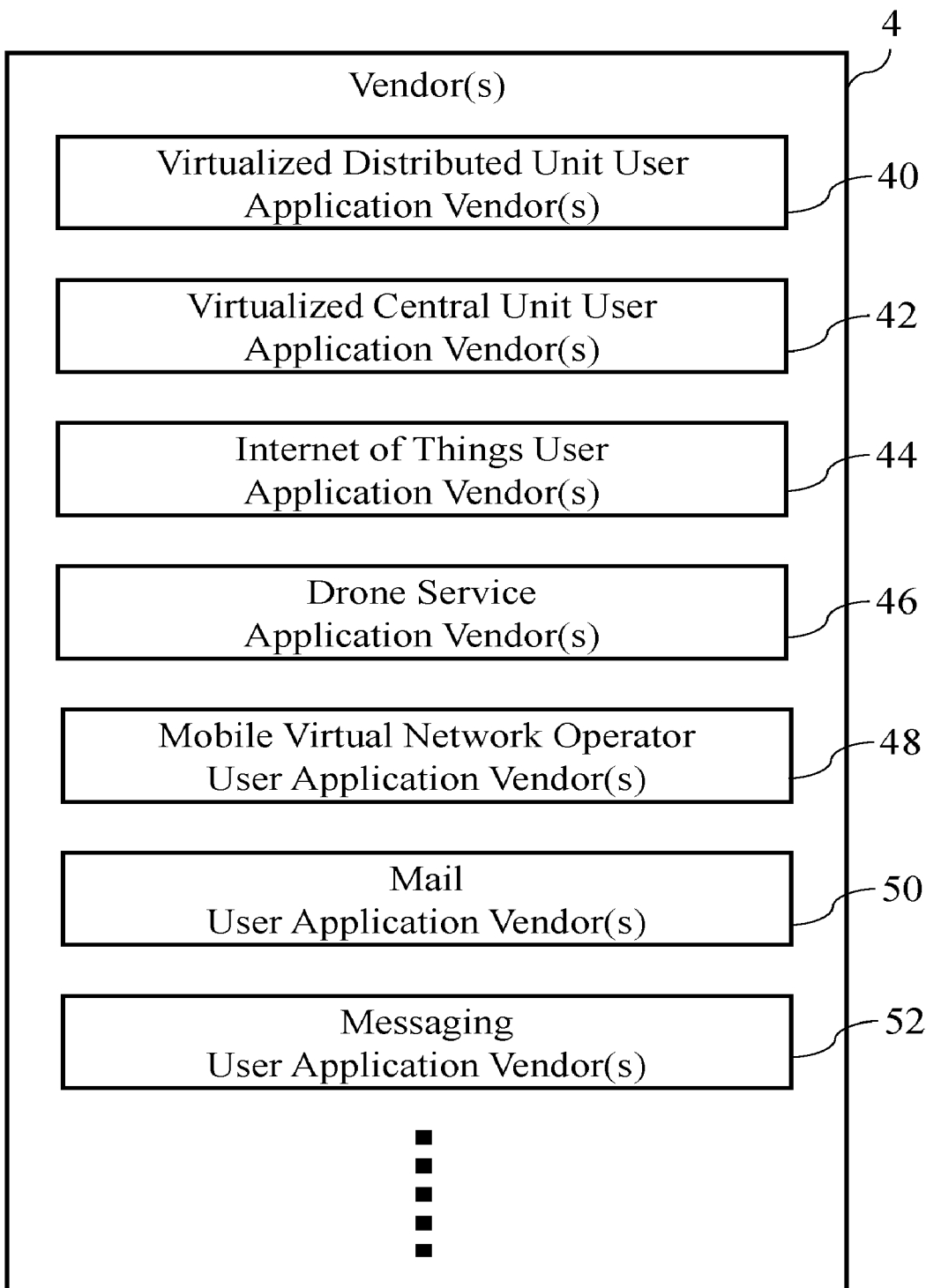

Example FIG. 6 illustrates a vendor(s) component of a network-as-a-service environment, in accordance with embodiments.

Figure 7:
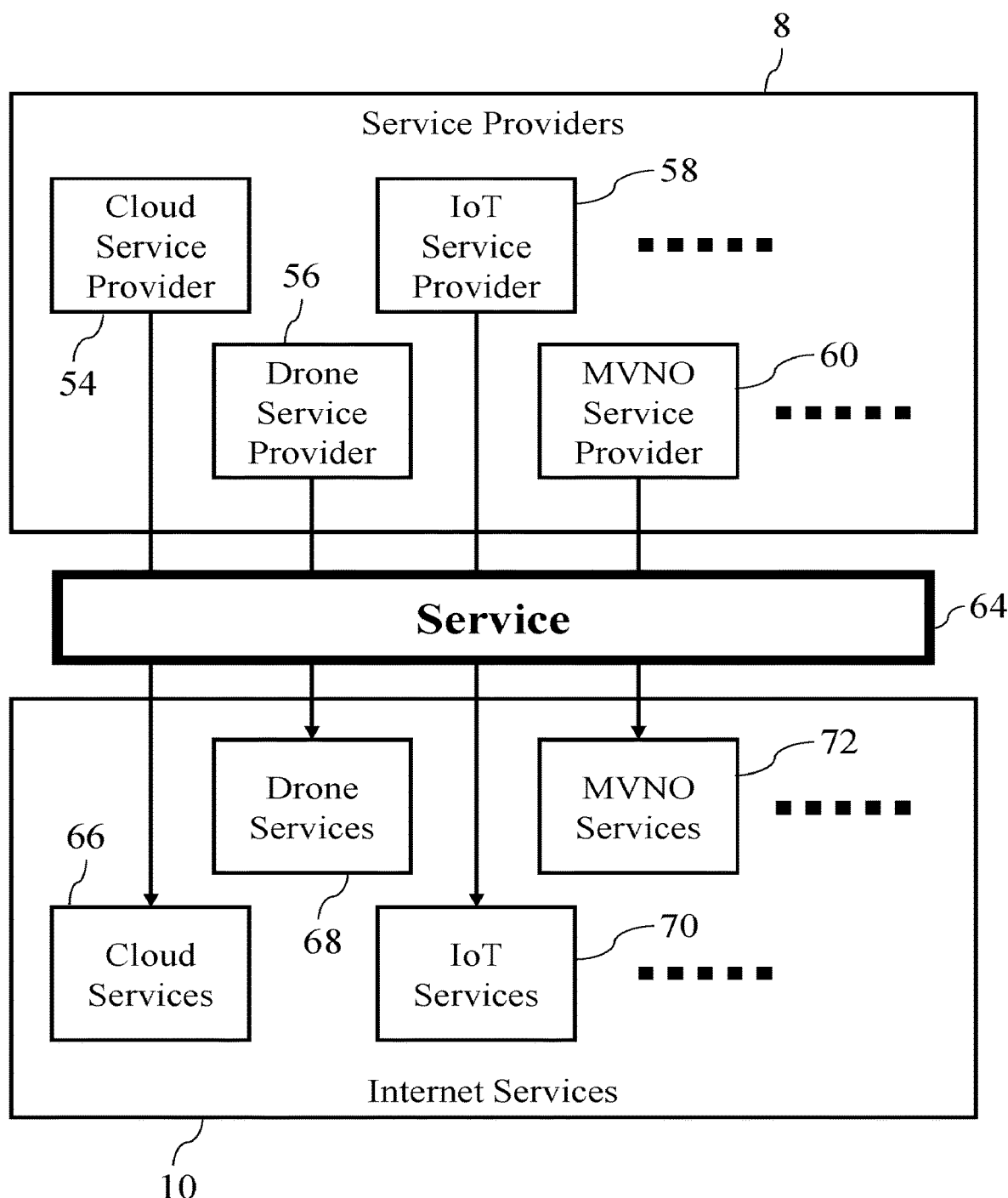

Example FIG. 7 illustrates configurations and interactions between service providers and internet services in a network-as-a-service environment, in accordance with embodiments.

Figure 8:
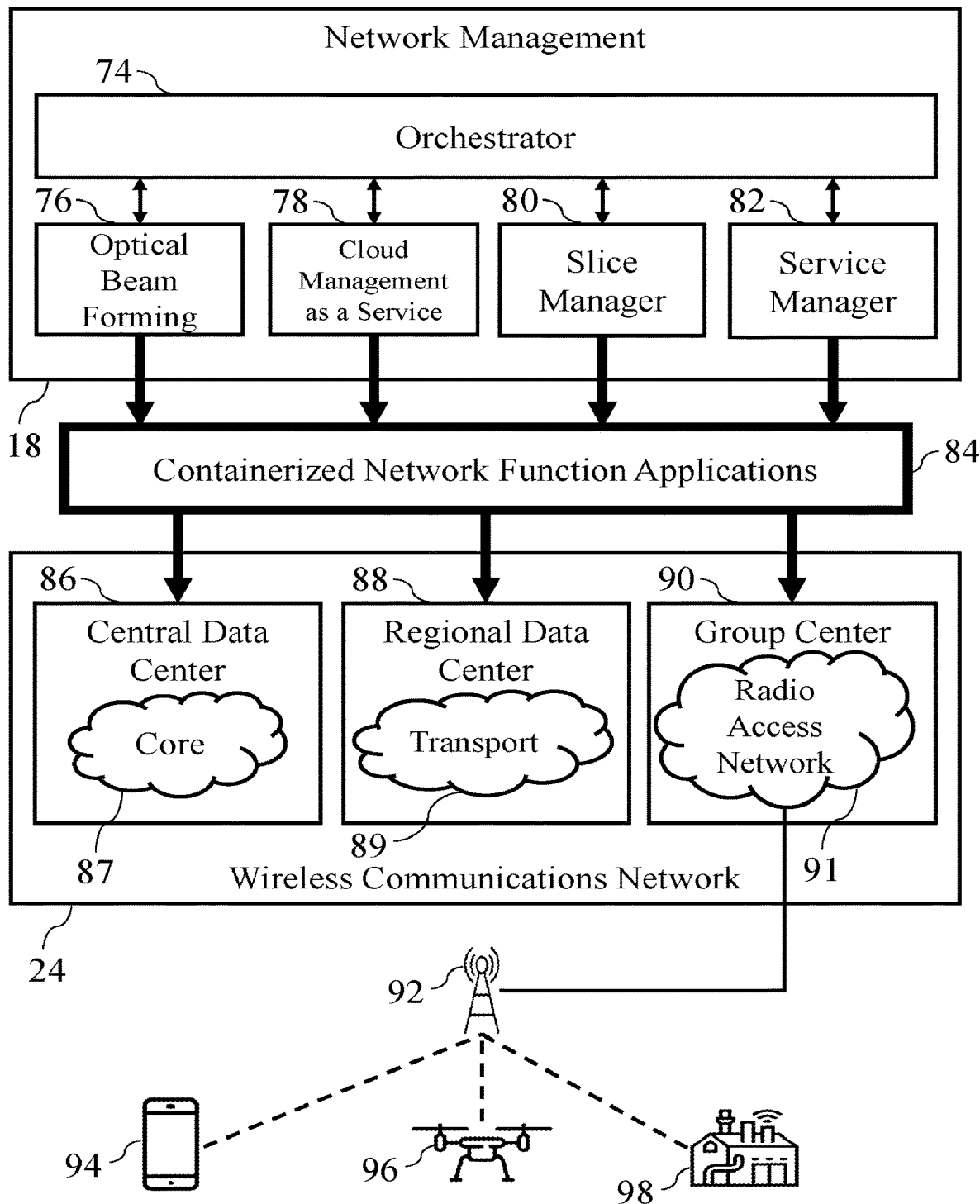

Example FIG. 8 illustrates configurations and interacts between network management and wireless communication network components in a network-as-a-service environment, in accordance with embodiments.

Example FIGS. 9A through 9F illustrate different network slices in a network-as-a-service environment, in accordance with embodiments.

Figure 10:
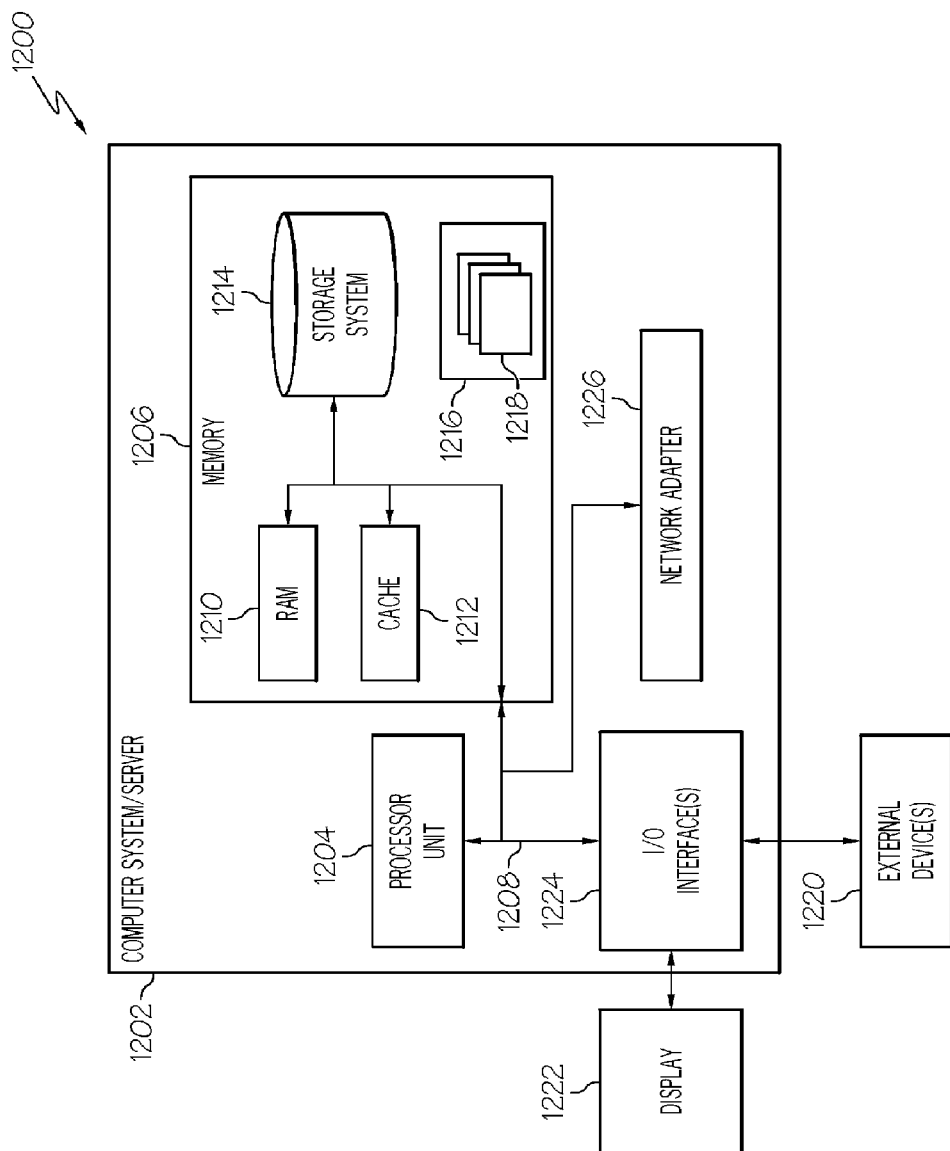

Example FIG. 10 illustrates a cloud computing node, in accordance with embodiments.

Figure 11:
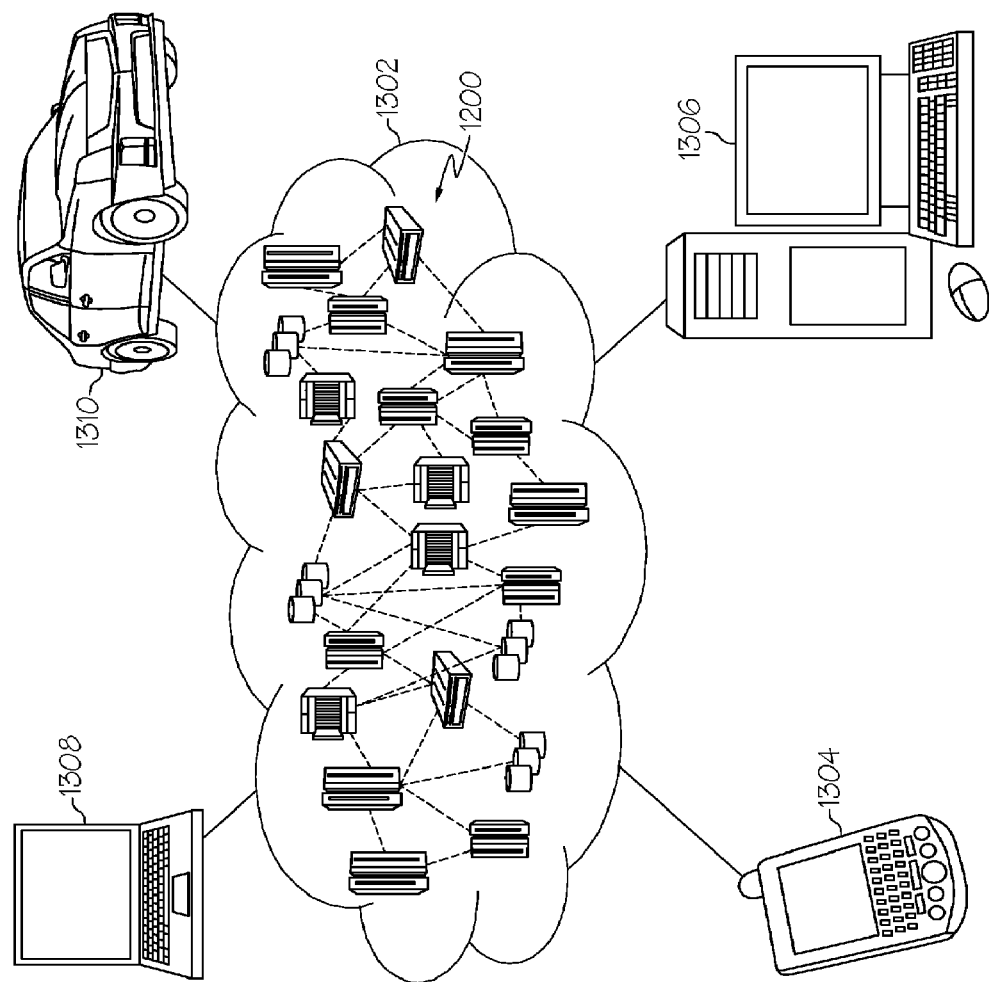

Example FIG. 11 illustrates a cloud computing environment, in accordance with embodiments.

Figure 12:
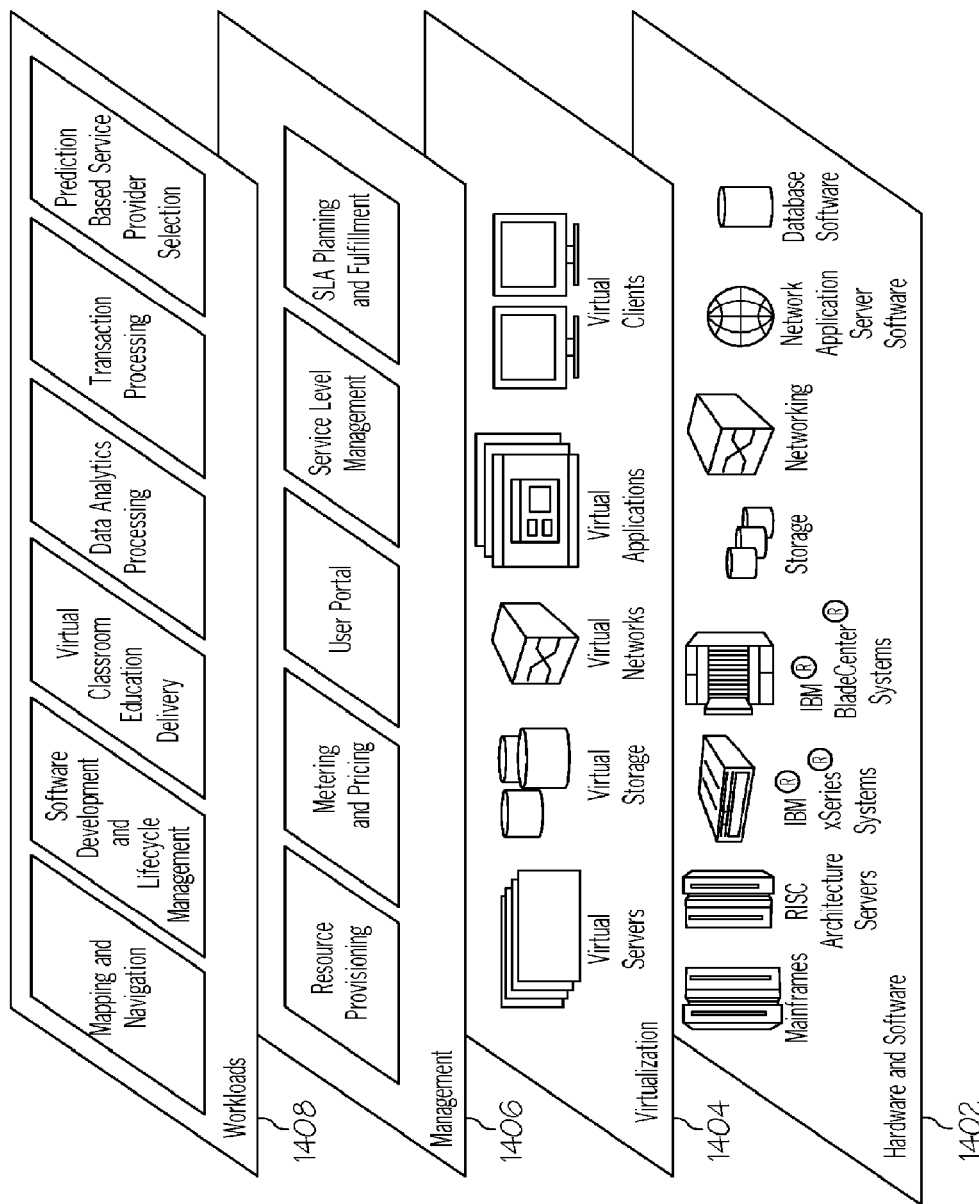

Example FIG. 12 illustrates abstraction model layers, in accordance with embodiments.

DESCRIPTION

Example FIG. 1 illustrates a general network-as-a-service 2 environment, in accordance with embodiments. A Network-as-a-Service (NaaS) 2 is a network environment and commercial concept, where participants in a network may interact automatically in an integrated infrastructure. For example, as illustrated in FIG. 1, end users 6, vendors 4, service providers 8, and/or internet services 10 may all interact and/or cooperate with each other automatically through network-as-a-service 2 infrastructure.

For illustration, end users 6 may be mobile phone subscribers who have a subscription with network-as-a-service 2 for connecting these end users 6 to their smartphones. These smartphones of the end users 6 may run a plurality of applications, such as messaging applications provided by one or more of the vendors 4 (e.g. WhatsApp, WeChat, KakaoTalk, Skype, etc.). Messaging applications are merely an example for the purpose of illustration and embodiments are not limited to messaging applications. Accordingly, vendors 4 (e.g. developers) of these example messaging applications may interact and/or cooperate through network-as-a-service 2 infrastructure. The example messaging applications may require the services of service providers 8 to operate, such as cloud computing services that has servers that run the server-side aspects of these example messaging applications. Accordingly, service providers 8 may interact and/or cooperate through network-as-a-service 2 infrastructure to allow end users 4 to run applications on their smartphones (that are developed from vendors 4) using cloud computing services of service providers 8. These example messaging applications may also need internet services 10 in order to connect the end users 6 to service providers 8.

When a vendor 4 develops an application to be used on a network, a network-as-a-service 2 may provide automatic integration, in accordance with embodiments. In embodiments, part of this automatic integration includes testing the application in the network-as-a-service 2 environment, to make sure that the application can be properly run on the network without errors and/or complications. Since a network has so many components, a network-as-a-service 2 may be configured to test the application in a comprehensive manner that tests all aspects of a network, in accordance with embodiments. In embodiments, automatic testing of an application on a network-as-a-service 2 greatly enhances the ability for vendors 4, service providers 8, end users 6, internet service providers, etc. to cooperate in an efficient manner to provide services while maintaining the integrity of a network.

Example FIG. 2 illustrates a process of testing a test application in a network-as-a-service 2 environment based on at least one performance parameter, in accordance with embodiments. Embodiments relate to a method and/or a system that implements the method. In embodiments, the wireless communication network may be deployed as a network-as-a-service 2. Although some embodiments relate to a network-as-a-service 2, embodiments are not limited to a network-as-a-service and may be applicable in other environments, as appreciated by those skilled in the art. Embodiments are not limited to wireless communication networks and may be applicable to any network that is capable of being automatically managed, implemented, and/or otherwise utilized.

As illustrated in step 3, the method may include receiving a test application to be tested on a wireless communication network. For example, in embodiments, a developer (e.g. vendor 4) may have a messaging application (e.g. test application) for smartphones, which the developer desires to test on a wireless communication network to test the usability of the user application. The developer may transmit, upload, and/or otherwise communicate the smartphone messaging user application (e.g. test application) to network-as-a-service 2 environment, which may be received by a testing unit of the network-as-a-service 2, in accordance with embodiments.

As illustrated in step 5, the method may include obtaining a test design for the test application. For example, in embodiments, if the test application is a messaging application for smartphones, then a test design may be obtained which is appropriate for testing the messaging application in the network-as-a-service 2. Since a messaging application for a smartphone may require cooperation and/or implementation by end users 6, service providers 8, and internet services 10, then a test design that includes testing all of these components may be obtained. A test design may be determined by network-as-a-service 2 through automatic and/or quasi-automatic means, in accordance with embodiments. Alternatively, a test design may be determined and/or decided by vendor 4 (e.g. through a graphical user interface or similar means). The test design may include at least one performance parameter, in accordance with embodiments.

As illustrated in step 7, the method may include defining one or more slices of the wireless communication network to test the test application based on the test design. For example, in embodiments, if the test application is a messaging application for smartphones, then the portions of a wireless communication network (e.g. slice of the wireless communication network) that is to be used to test the messaging application is defined. For example, a messaging application may be anticipated to use radio access networks, group (data) centers, regional data centers, and/or central data centers, so the defined slice of the wireless communication network may include these components.

In embodiments, the defining the at least one slice of the wireless communication network may be defined based on the at least one performance test parameter. The at least one slice of the wireless communication network may include at least one test wireless network service.

As illustrated in step 9, the method may include performing at least one performance test on the at least one slice of the wireless communication network for the test application based on the at least one performance parameter.

In embodiments, the method may include deploying one or more test wireless network services to test the test application in the wireless communication network based on the defined one or more slices of the wireless communication network. For example, if the test application is a messaging application for smartphones, then a test radio access network (e.g. a test wireless network service) may be deployed in a group (data) center, which may be utilized by the test application. This example test radio access network may be part of a defined slice of the wireless communication network based on the test design, in accordance with embodiments. As another example, a test core network may be deployed in a central data center and/or a test transport network may be deployed in a regional data center.

In embodiments, the method may include simulating one or more components of the defined one or more slices of the wireless communication network to test the test application. The simulating the one or more components of the defined one or more slices of the wireless communication network may include communication with the one or more test wireless network services. For example, if the test application is a messaging application for smartphones, then the method may simulate a smartphone in the wireless communication network (e.g. using a mock worker), in accordance with embodiments. As another example, the method may simulate a test radio access network, in accordance with embodiments. These simulated components may be part of the defined slice of the wireless communication network.

Example FIG. 3 illustrates configurations and interactions of components in a network-as-a-service 2 environment, in accordance with embodiments. Network-as-a-service 2 may include general components, such as a market place 14, a network management unit 18, and/or a wireless communications network 24. When vendors 4 test a test application on the network-as-a-service 2, an on boarding 12 protocol may be implemented. In embodiments, on boarding 12 may be any protocol, procedure, transmission, and/or similar that is implemented when a vendor 4 attempts to make their application useable on the network-as-a service 2.

As part of the on boarding 12 process, which may interface with market place 14, services may need to be purchased 20 from service providers 8. For example, if the test application that is being on boarded 12 is a messaging application for smartphones, then cloud computing services may need to be purchased 20 from service providers 8 for both the testing process and the ultimate operation of the messaging application once it is configured and authorized for the wireless communication network 24.

The market place 14 may implement an ordering 16 process to network management unit 18 to perform certain tasks, such as deploying test wireless services. In embodiments, network management unit 18 may interface in operation 22 with service providers 8 to coordinate the services of the service providers 8. One role of network management unit 18 is to manage wireless communication network 24, which provides services to end users 6. Service providers 8 may provide service 26 through internet services 10, which are provided and/or connected to wireless communication network 24.

Example FIG. 4 illustrates configurations and interactions at a market place 14 of a network-as-a-service 2 environment, in accordance with embodiments. As discussed above, in embodiments, market place 14 may interface and/or communicate with vendors 4, service providers 8, network management unit 18, and/or other system components appreciated by those skilled in the art. In embodiments, vendors 4 may interface with a vendor interface 34 of market place 14. In embodiments, service providers 8 may interface with service provider interface 36 of market place 14. In embodiments, network management unit 18 may interface with network management interface 38 of market place 14. In some embodiments, vendor interface 34, service provider interface 36, and/or network management interface 38 may include specific hardware for designated tasks. In other embodiments, vendor interface 34, service provider interface 36, and/or network management interface 38 may use virtual resources (e.g. software services) for designated tasks.

Market place 14 may include a processing unit 30, which may control the operations of market place 14. In embodiments, processing unit 30 may control vendor interface 34, service provider interface 36, and/or network management interface 38, directly or indirectly. Processing unit 30 may also communicate and/or otherwise interface with testing unit 28 and/or database 32.

In embodiments, the receiving the test application to be tested on the wireless network 24 is received at a testing unit 28. In embodiments, vendor interface 34 is directly and/or indirectly communicating with testing unit 28. In embodiments, the obtaining the test design for the test application to be tested is obtained at the testing unit 28. Testing unit 28 may retrieve one or more test designs from database 32. Database 32 may be directly and/or indirectly communication with testing unit 28. For example, testing unit 28 may communicate with database 32 through processing unit 30 or by other means appreciated by those skilled in the art.

Embodiments relate to a method and/or system that implements a method. In embodiments, the system may include a testing unit 28 configured to receive a test application to be tested on a wireless communication network 24 and obtain a test design for the test application. The test design may include at least one performance parameter. In embodiments, the system may include an orchestrator unit configured to define at least one slice of the wireless communication network 24 to test the test application based on the test design. The at least one slice of the wireless communication network 24 may include at least one test wireless network service. In embodiments, the system may include at least one data center configured to simulate at least one component of the defined at least one slice of the wireless communication network to test the test application. The simulating the at least one component of the defined at least one slice of the wireless communication network 24 may include communication with the at least one test wireless network service based on the at least one performance parameter.

In embodiments, the at least one performance parameter may be one or more of network configurations, network capacity, threshold parameters, and/or benchmarks. In embodiments, the at least one performance test may include testing for faults in the wireless communication network. In embodiments, the testing for faults in the wireless communication network may include testing for communication failures. In embodiments, the testing for faults in the wireless communication network may include testing for configuration errors.

In embodiment, the at least one performance test may include testing for stress on the wireless communication network. In embodiments, the testing for stress on the wireless communication network may include testing communication capacity effects on the wireless communication network by the test application when scaling up implementation of the test application on the wireless communication network. In embodiments, the testing for stress on the wireless communication network may include testing computational capacity effects on the wireless communication network by the test application.

In some embodiments, the test design may be automatically generated by the testing unit. For example, testing unit 28 and/or processing unit 30 may choose which test design to implement based on a variety of factors appreciated by those skilled in the art without requiring input from vendors 4. In other embodiments, the test design may be defined by a user ordering a test of the test application at the testing unit. For example, testing unit 28 may communicate options, choices, and/or otherwise solicit feedback from vendors 4 to choose a test design and/or construct a test design. In embodiments, vendors 4 may choose some or all features of a test design with use of test design attributes stored in database 32 presented to vendors 4 through vendor interface 34. In embodiments, vendors 4 may select from a plurality of test designs stored in database 32 presented to vendors 4 through vendor interface 34. In embodiments vendors may select features of a test design without use of information stored in database 32.

In embodiments relating to a system, the system may include the testing unit 28 configured to receive a test application to be tested on a wireless communication network 24 and obtain a test design for the test application.

Example FIG. 5 illustrates database(s) 32 included in a network-as-a-service 2, in accordance with embodiments. In embodiments, database(s) 32 may include a fault performance database 33, a configuration performance database 35, a failure performance database 37, a stress performance database 39, and/or any other kind of database appreciated by those skilled in the art. Database(s) [32, 33, 35, 37, and/or 39] may include performance parameters which may be used in a test design, in accordance with embodiments.

Example FIG. 6 illustrates a vendor(s) 4 component of a network-as-a-service 2 environment, in accordance with embodiments. In embodiments, the test application may be a virtualized distributed unit user application, a virtualized central unit user application, an internet-of-things user application, a drone service application, a mobile virtual network operator user application, a mail user application, a messaging user application, and/or another kind of application appreciated by those skilled in the art.

In embodiments, a virtualized distributed unit user application may be provided by a virtualized distribute unit user application vendor 40. In embodiments, a virtualized central unit user application may be provided by a virtualized central unit user application vendor 42. In embodiments, an internet-of-things user application may be provided by an internet-of-things user application vendor 44. In embodiments, a drone service application may be provided by a drone service application vendor 46. In embodiments, a mobile virtual network operator user application may be provided by a mobile virtual network operator user application vendor 48. In embodiments, a mail user application may be provided by a mail user application vendor 50. In embodiments, a messaging user application may be provided by a messaging user application vendor 52. Embodiments relate to any other kind of application vendor appreciated by those skilled in the art.

Example FIG. 7 illustrates configurations and interactions between service providers 8 and internet services 10 in a network-as-a-service 2 environment, in accordance with embodiments. Service providers 8 may include cloud service providers 54, drone service providers 56, internet-of-things (IoT) service providers 58, mobile virtual network operator (MVNO) service providers 60, and/or any other service providers appreciated by those skilled in the art. The services 64 of service providers 8 may be provided to corresponding internet services. For example, in embodiments, cloud service provider 54 may provide service 64 to cloud services 66 using internet services 10. In embodiments, drone service provider 56 may provide service 64 to drone services 68 using internet services 10. In embodiments, IoT service provider 58 may provide service 64 to IoT services 70 using internet services 10. In embodiments, MVNO service provider 60 may provide service 64 to MVNO services 72 using internet services 10.

Example FIG. 8 illustrates configurations and interacts between network management unit 18 and wireless communication network 24 components in a network-as-a-service 2 environment, in accordance with embodiments. In embodiments, network management unit 18 may include an orchestrator unit 74. Orchestrator unit 74 may control network functions such as optical beam forming 76, cloud management-as-a-service 78, slice manager 80, service manager 82, and/or any other network functions/units appreciated by those skill in the art.

In embodiments, network-as-a service 2 may be implemented using containers. Containers are virtual server elements that are implemented in wireless communication network 24. Each container may be a virtual server operation unit. At least one container may be deployed in a cluster. At least portions of the at least one group center 90, the at least one regional data center 88, and/or the at least one central data center 86 of wireless communication network 24 may be included in a cluster. A central data center 86 may include one or more core network 87, which may be implemented by containers, in accordance with embodiments. A regional data center 88 may include one or more transport network 89, which is lower in network hierarchy than core network 87, which may be implemented by containers, in accordance with embodiments. Group center 90 may include one or more radio access networks 91, which may be implemented by containers, in accordance with embodiments. Radio access networks 91 are lower in network hierarchy than transport networks 89. Radio access networks 91 may control base stations 92, which may be in wireless communication with wireless devices such as smartphones 94, drones 96, smart application 98 (e.g. smart factories, smart homes, etc.), and/or any other wireless connected device appreciated by those skilled in the art. Although only one base station 92 is illustrated, those skilled in the art appreciate that a radio access network 91 may manage a plurality of base stations, in accordance with embodiments.

Containers may be implemented using containerized network function applications 84 and/or any other mechanism appreciated by those skilled in the art. For example, in embodiments, optical beam forming 76, cloud management-as-a-service 78, slice management 80, and/or service management 82 may be implement in wireless communications network through containerized network function applications 84.

In embodiments, the defining the one or more slices of the wireless communication network 24 to test the test application may be performed by an orchestrator unit 74 in conjunction with slice manager 80. In embodiment, an orchestrator unit 74 may control the defined slice(s) of the wireless communication network 24 to test a test application. In embodiments, the orchestrator unit 74 may deploy one or more test wireless network services to test a test application.

Embodiments relate to a system. The system may include orchestrator unit 74 configured to define one or more slices of the wireless communication network 24 to test a test application based on the test design and to deploy at least one test wireless network service to test the test application in the wireless communication network 24 based on the defined at least one slice of the wireless communication network 24.

Example FIGS. 9A through 9F illustrate different network slices [100, 101, 103, 105, 107, and/or 109] in a network-as-a-service 2 environment, in accordance with embodiments. In embodiments, a test application may be tested in at least one of least one or more group centers 90, one or more regional data centers 88, and/or one or more central data centers 86. Although FIGS. 9A through 9F only illustrate one group center 90, one regional data center 88, and one central data center 86 for simplicity of illustration and explanation, those skilled in the art appreciate that any number of data centers in these categories may be implemented in accordance with embodiments. In embodiments, one or more test wireless network services (e.g. radio access network 91, transport network 89, and/or core network 87) may include a plurality of test wireless network services in any one of group center 90, regional data center 88, and/or central data center 86. Although FIGS. 9A through 9F only illustrate one radio access network 91, one transport network 89, and one core network 87 for simplicity of illustration and explanation, those skilled in the art appreciate that any number of wireless network services in these categories may be implemented in accordance with embodiments. For example, using containerized network function application 84 (illustrated in FIG. 8), any number of wireless network services may be implemented, including test wireless network services. In embodiments, a test design may include a plurality of implementations tested in parallel on a plurality of test wireless network services.

Figure 9A:
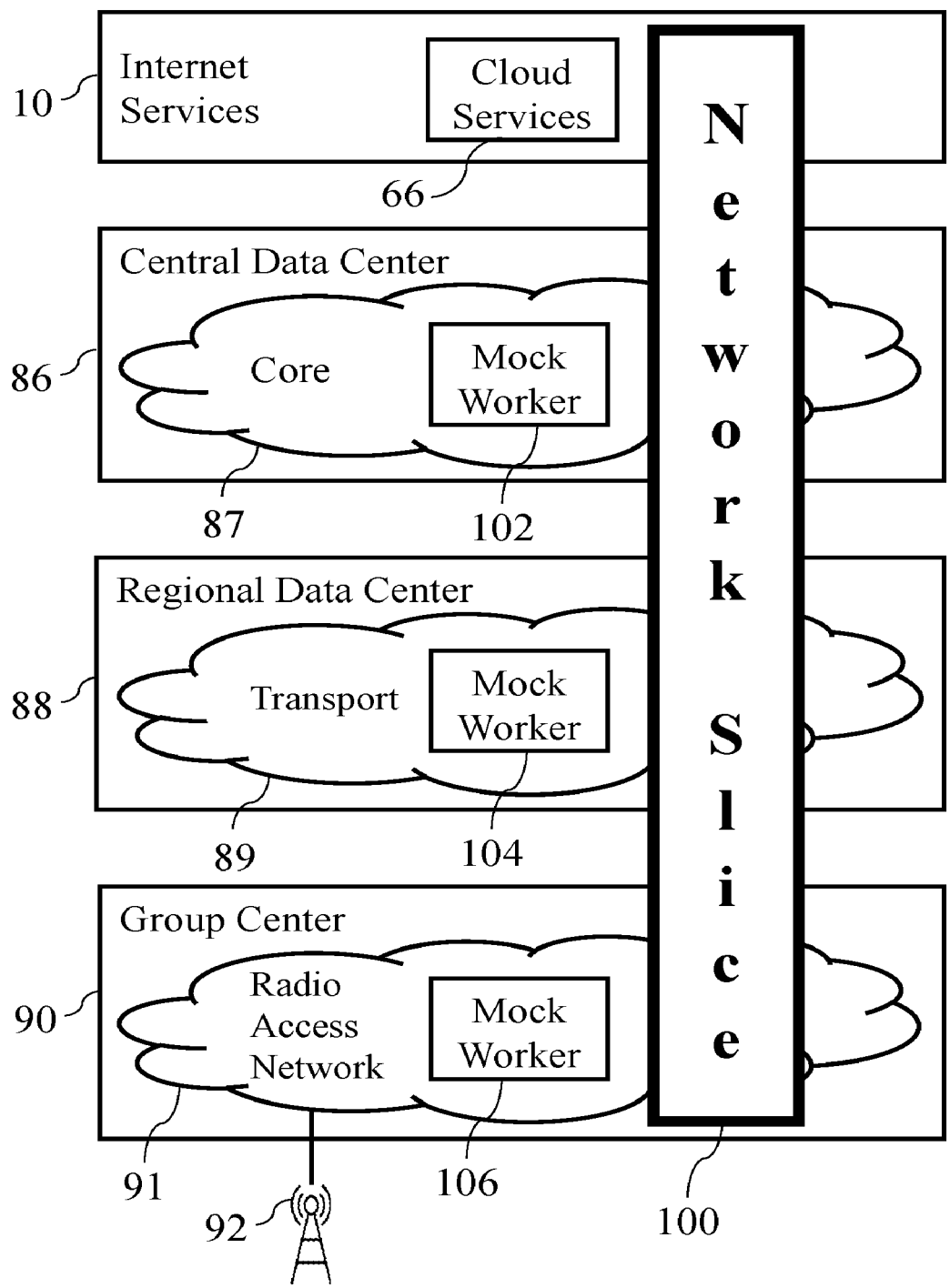

In example FIG. 9A, network slice 100 (e.g. defined by test unit 28) may include portions of internet services 10, core network 87 (e.g. in central data center 86), transport network 89 (e.g. in regional data center 88), and/or radio access network 91 (e.g. in group center 90). In embodiments, radio access network 91 may be a test radio access network deployed based on a test design. For example, if a test application is a messaging application for smartphones, the messaging application may need functionality of internet services 10, core network 87, transport network 89, and radio access network of wireless communication network 24. Accordingly, in this example, the slice 100 defined in wireless communication network 24 would include all of these network components.

In embodiments, the method is employed to test the test application in all hierarchy levels of the defined one or more slices 100 of the wireless communication network 24. Aspects of embodiments, as illustrated in example FIG. 9A, provide for comprehensive testing of a test application throughout the network hierarchy to improve the testing efficiency and effectiveness. Without the ability to comprehensively test all relevant network components of wireless communication network 24, a test application may be erroneously tested or the test may otherwise be highly dependent on human resources, to significant inconvenience, inefficiency, and/or ineffectiveness to vendors 4. With comprehensive testing in an automatic way, operator of network-as-a-service 2 may be able to facilitate the efficient implementation of vendor requests, thus benefiting end users 6, vendors 4, service providers 8, and/or other relevant parties appreciated by those skilled in the art.

In embodiments, the at least one slice 100 of the wireless communication network 24 may include at least one group center 90. In embodiments, the at least one slice 100 of the wireless communication network 24 comprises at least one regional data center 88. In embodiments, the at least one wireless network service (e.g. transport network 89) is deployed by the at least one regional data center 88. In embodiments, the at least one slice 100 of the wireless communication network 24 may be at least one central data center 86. In embodiments, the at least one wireless network service (e.g. core network 87) may be deployed by the at least one central data center 86.

In embodiments, the at least one performance test may include testing for at least one of faults and/or stress in the at least one regional data center 88 when deploying the at least one wireless network service (e.g. transport network 89). In embodiments, the at least one performance test may include testing for at least one of faults and/or stress in the at least one central data center 86 when managing the at least one regional data center 88.

In embodiments, the at least one wireless network service (e.g. core network 87, transport network 89, and/or radio access network 91) comprises a plurality of wireless network services. In embodiments, the test design may include a plurality of implementations in parallel at the plurality of wireless network services such that the performing the at least one performance test tests at least one of faults and/or stress on the at least one slice 100 of the wireless communication network 24 by the test application.

In embodiments, at least one of the at least one group center 90, the at least one regional data center 88, and/or the at least one central data center 86 may interface with internet service 10. The internet service 10 may include application services, encryption services, financial services, document management services, security services, cloud services 66, drone services 68, internet-of-things services 58, and/or any other services appreciated by those skilled in the art.

In embodiments, the at least one test wireless network service (e.g. core network 87, transport network 89, and/or radio access network 91) comprises at least one test virtual radio access network 91. Although only one radio access network 91 is illustrated for simplicity of explanation, any number of radio access networks may be implemented in any given group center 90. The at least one test virtual radio access network 91 may be deployed in one or more group center 90. The one or more group center 90 may be a data center that controls at least one base station 92.

At least one component of the defined one or more slices of the wireless communication network 24 may include one or more simulated user equipment (e.g. mock worker 106). The test application may be a test user application. In embodiments, the method may include simulating at least one user equipment (e.g. mock worker 106) to test the test user application in the at least one group center 90. In embodiments, the at least one performance test may include testing for at least one of faults and/or stress in the at least one group center 90 by the at least one simulated user equipment (e.g. mock worker 106).

For example, a simulated user equipment may be a mock worker 106 in radio access network 91. Mock worker 106, may be a simulation of a smartphone or any other wireless device, network element, and/or application appreciated by those skill in the art. For example, if the test user application is a messaging application for a smartphone, mock worker 106 may simulate a smartphone in radio access network 91.

Similar to mock worker 106 in radio access network 91, transport network 89 may include mocker worker 104 in accordance with the test design. For example, if the test application is a messaging application for smart phones, then some network functionality for the messaging application may be needed in transport network 89, thus possibly requiring mock worker 104 simulating a network element and/or function. Likewise, in embodiments, mocker worker 102 may be implemented in core network 87 at central data center 86.

Figure 9B:
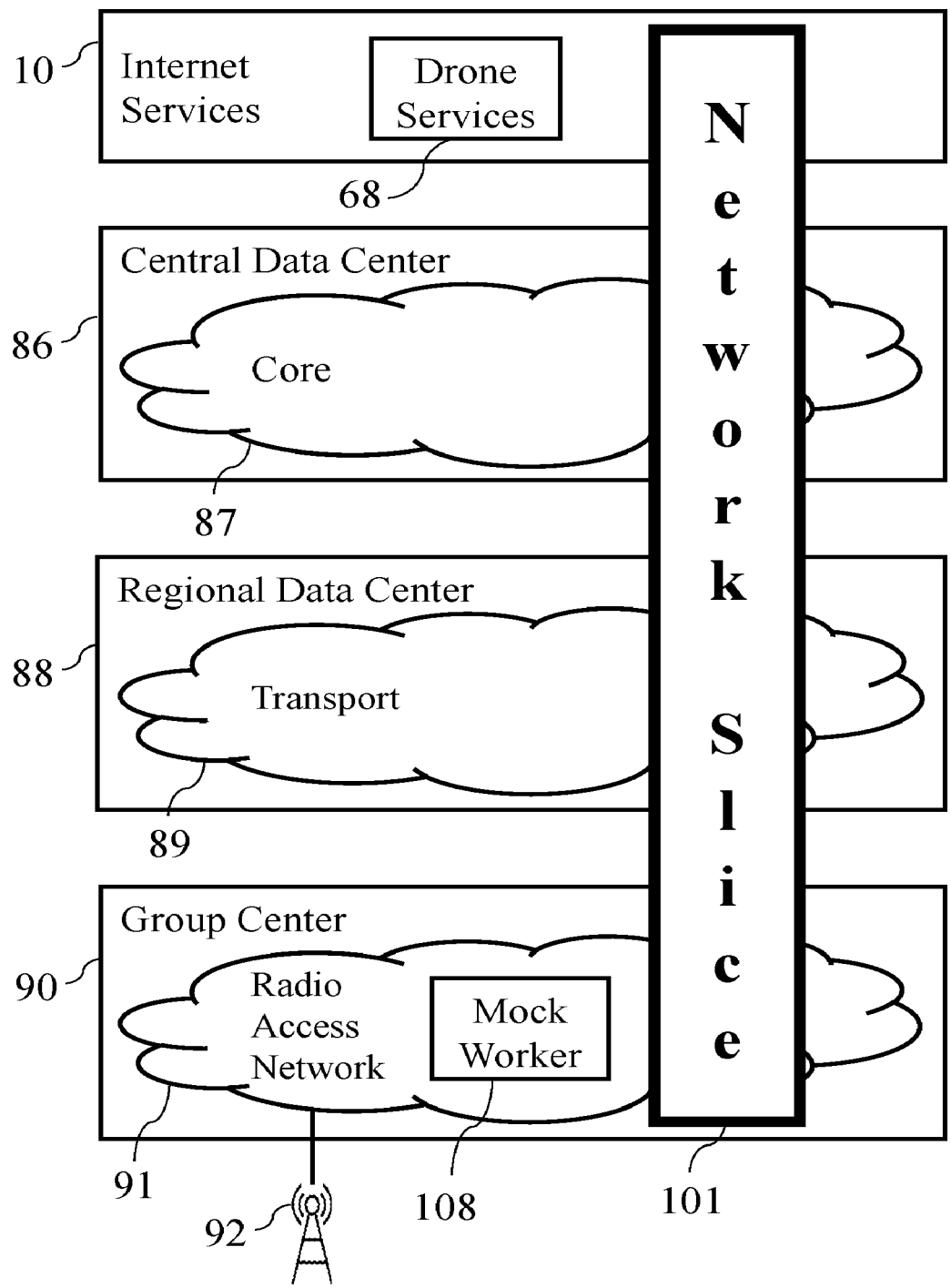

As illustrated in example FIG. 9B, in embodiments, a test design having network slice 101 for a particular test application may not require mock workers in all major network components. As shown in FIG. 9B, mocker worker 108 is implemented in radio access network 91 for a particular test design, but no mock workers are implemented in central data center 86 or regional data center 88. For example, a test application may not require the simulation of network components in central data center 86 or regional data center 88 for a particular test design illustrated in FIG. 9B.

Figure 9C:
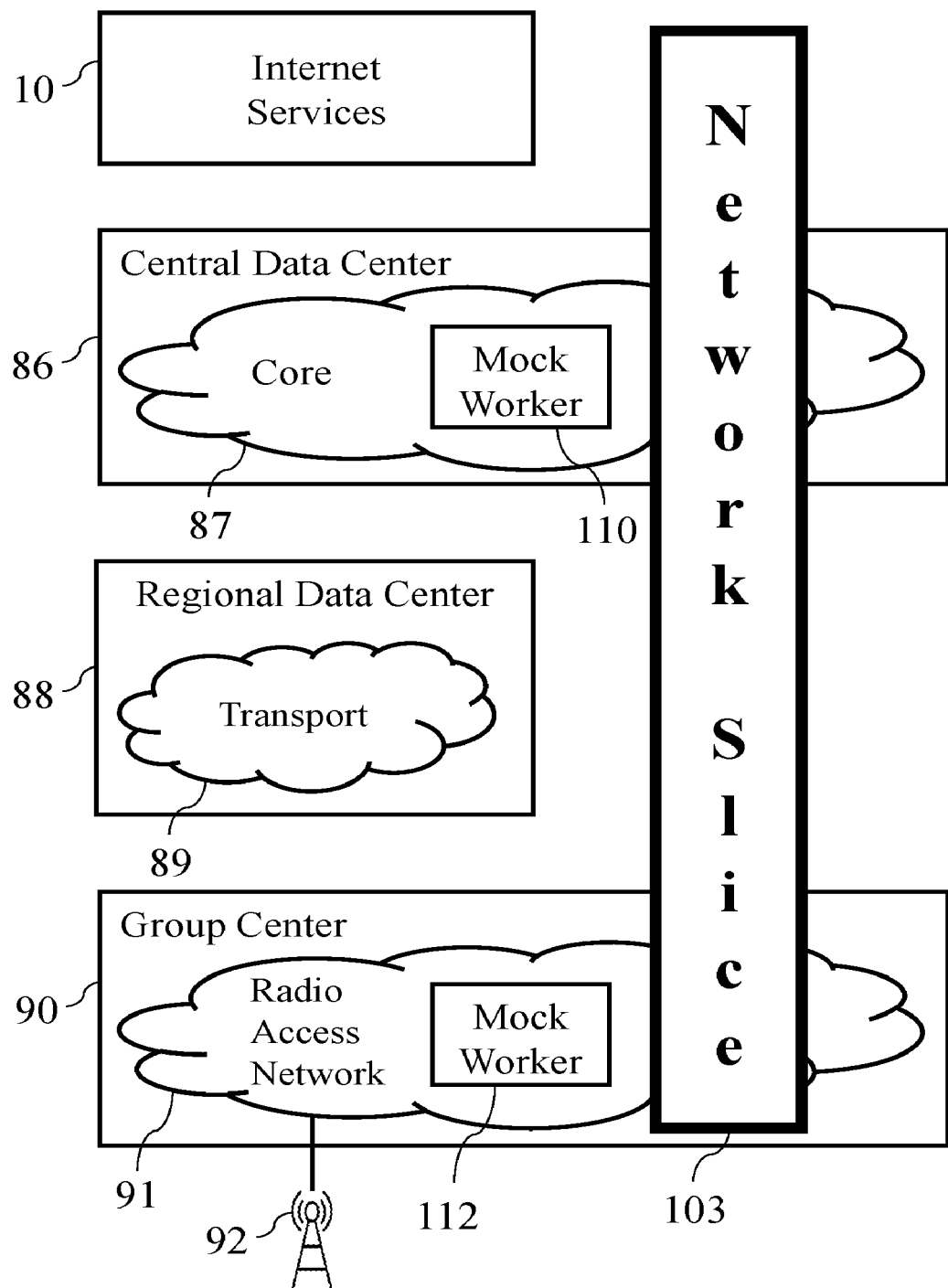

As illustrated in example FIG. 9C, in embodiments, a test design having network slice 103 for a particular test application may not require all network components. As shown in FIG. 9C, network slice 103 is only implemented in core network 87 of central data center 86 and radio access network 91 of group center 90. In this example, a test application may not utilize internet service components and/or transport network 89 components. Accordingly, network slice 103 defined by testing unit 28 may not include internet services 10 and regional data center 88 when defining the slice of the wireless communication network in step 7 illustrated in FIG. 2.

Figure 9D:
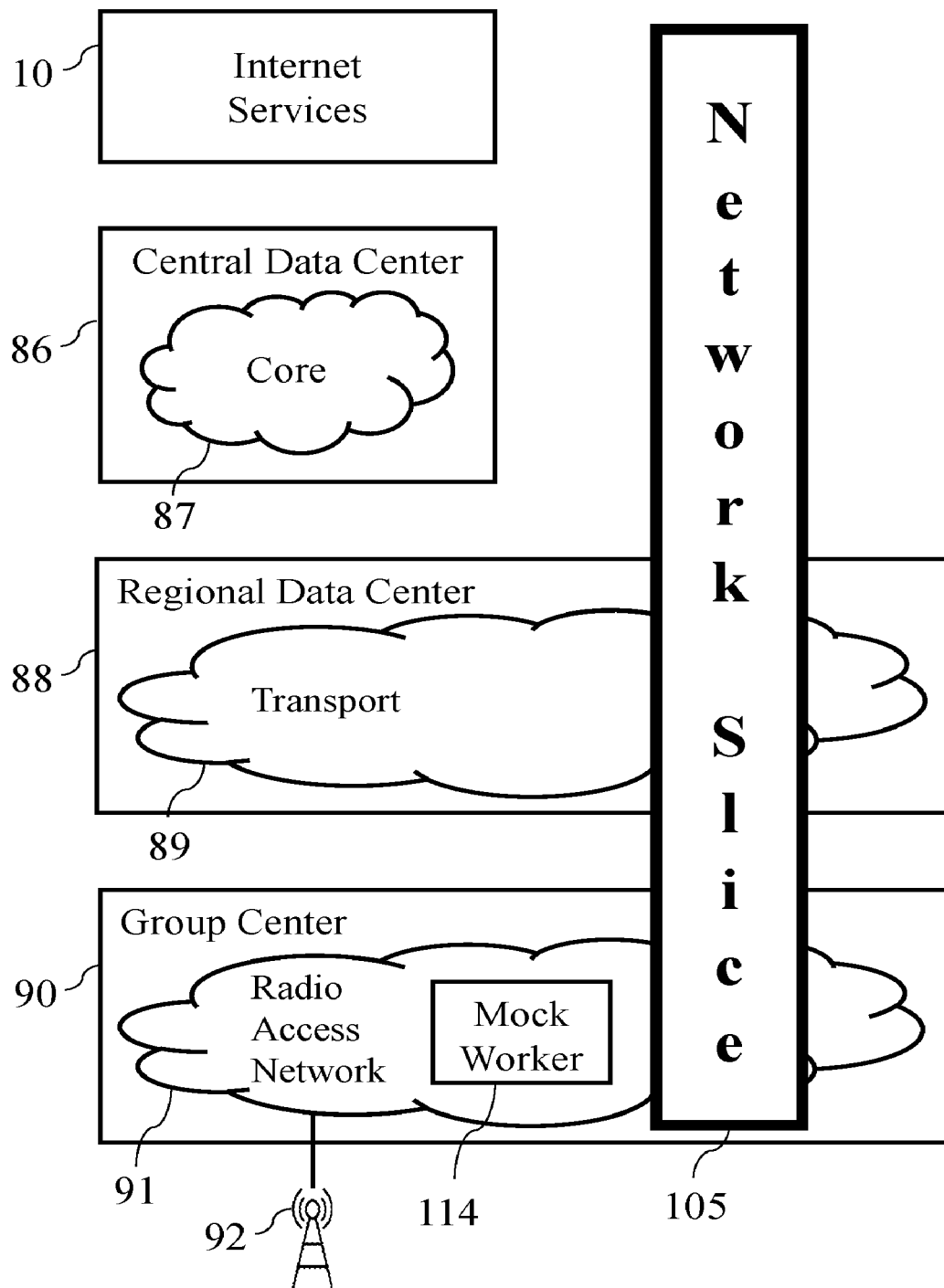

Likewise, as illustrated in example FIG. 9D, network slice 105 may not include central data center 86 and internet services 10 based on a particular test design. Mock worker 114 may only be implemented in radio access network 91.

Figure 9E:
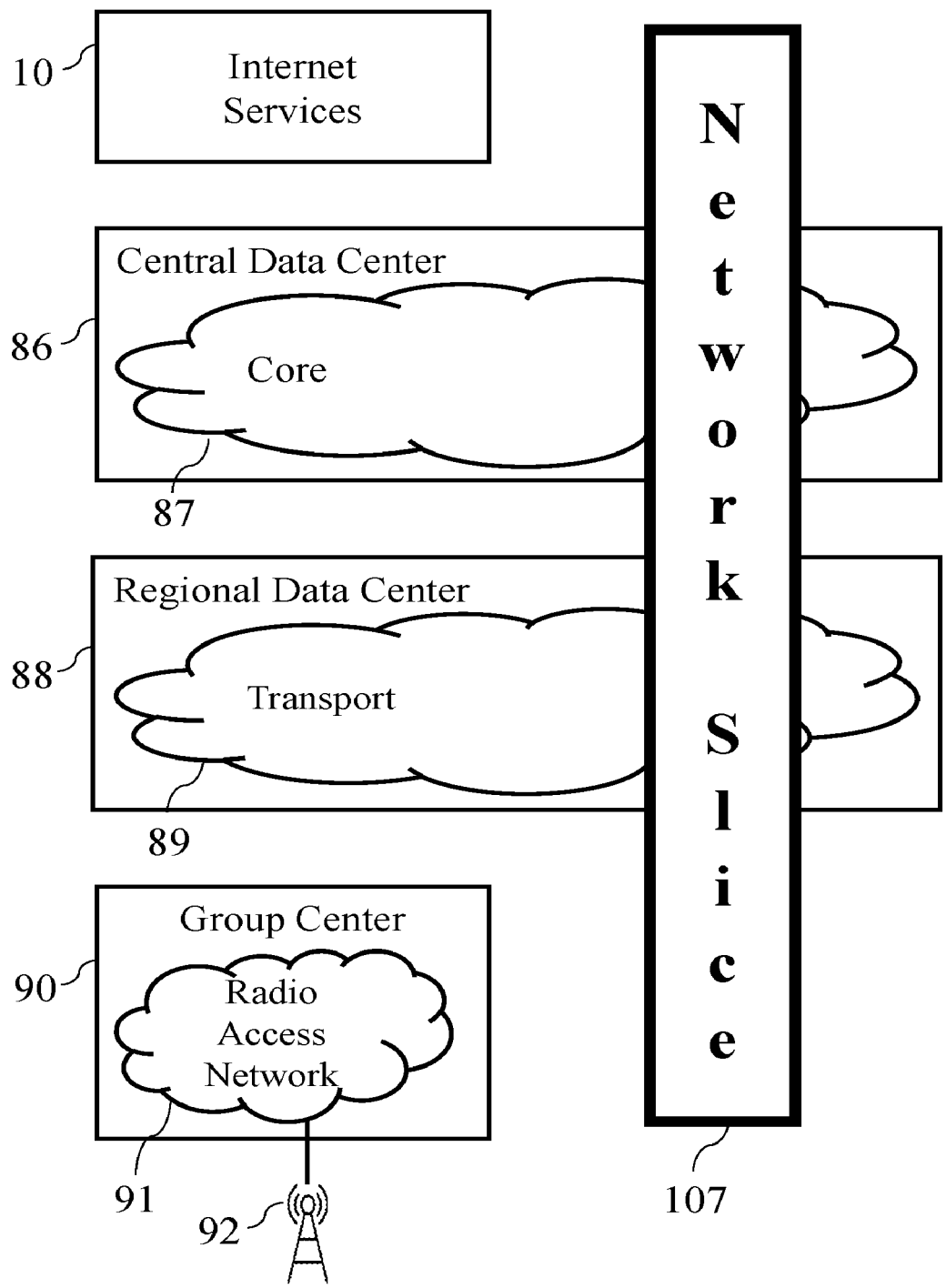

As another example, as illustrated in example FIG. 9E, network slice 107 may not include group center 90 or internet services 10 for a particular test design. Also, for the particular test design implemented in slice 107, no mock workers may be implemented in central data center 86 or regional data center 88.

Figure 9F:
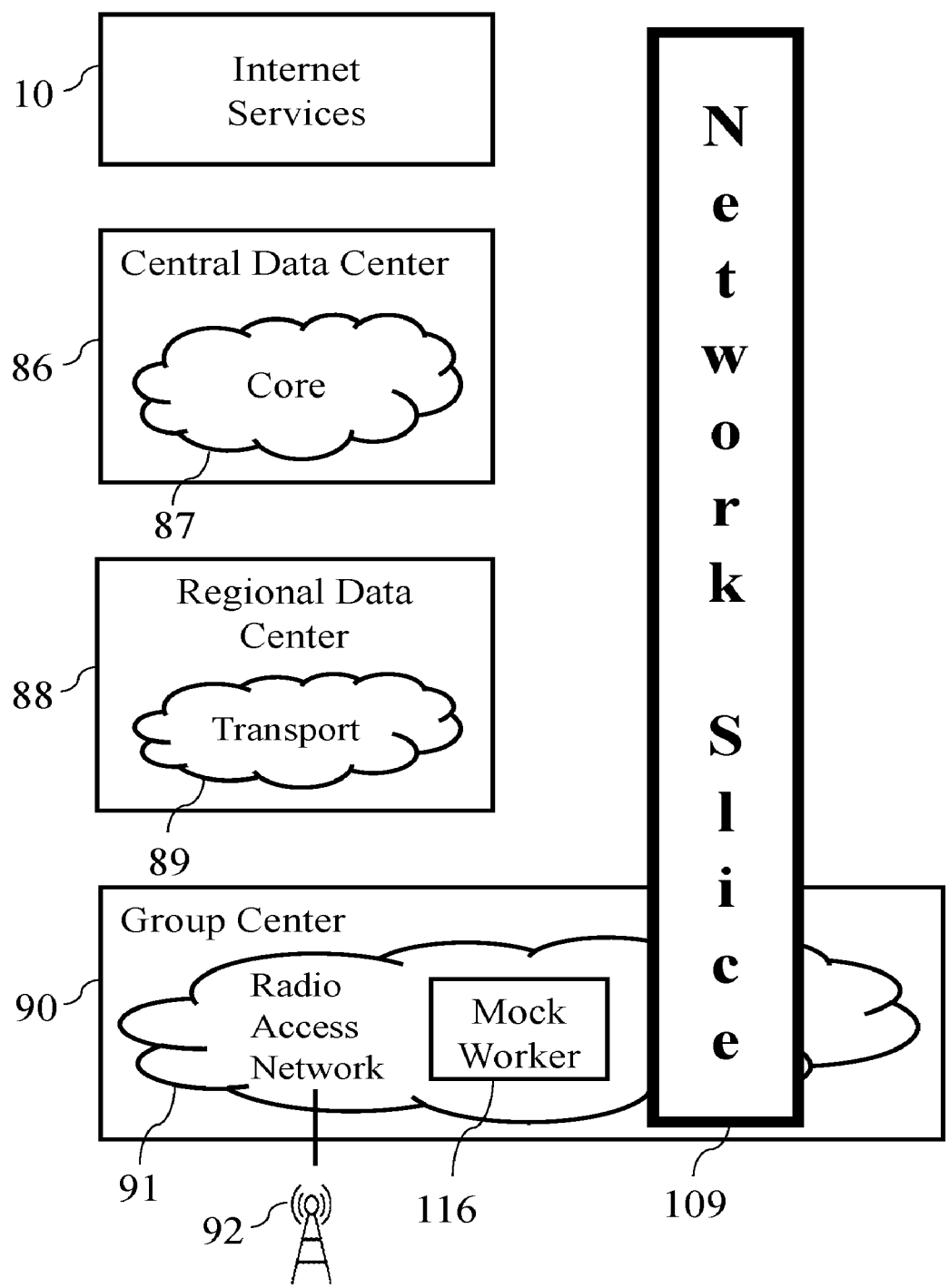

As yet another example, as illustrated in example FIG. 9F, network slice 109 may not include internet services 10, central data center 86, or regional data center 88 for a particular test design. Network slice 109 may only be implemented in group center 90 using mock worker 109 as the simulated network component.

Example FIGS. 9A through 9F only illustrate a few examples of combinations of network slices and mock workers, which can be implemented. In embodiments, any combination of network components may be included in network slices defined by any kind of test design. Likewise, mock workers or any other kind of simulated network component appreciated by those skilled in the art may be implemented with full flexibility based on the test design. In embodiments, any of the wireless communication network services may be simulated in test form (e.g. a test core network, a test transport network, a test radio access network, etc.).

The simulating one or more simulated user equipment (e.g. mock worker [106, 108, 112, 114, and/or 116]) to test a test application may be performed in the one or more group center 90, as illustrated in FIGS. 9A, 9B, 9C, 9D, and 9F. In embodiments, the simulating the one or more components of the defined one or more slices [100, 101, 103, 105, 107, and/or 109] of the wireless communication network 24 may be performed by one or more mock workers [102, 104, 106, 108, 110, 112, 114, and/or 116] in any part of the wireless communication network 24, as illustrated in FIGS. 9A, 9B, 9C, 9D, and 9F. In some embodiments, such as in FIG. 9E, no mock workers may be deployed, depending on the test design. The one or more mock workers [102, 104, 106, 108, 110, 112, 114, and/or 116] may control the at least one test wireless network service. In embodiments, the one or more mock workers [102, 104, 106, 108, 110, 112, 114, and/or 116] may mimic the behavior of the one or more simulated components of the defined one or more slices [100, 101, 103, 105, 107, and/or 109] of the wireless communication network 24 to test a test application.

In embodiments, a method and/or system includes deploying the one or more mock workers [106, 108, 112, 114, and/or 116] in the one or more group center 90 to test the test application based on the test design. In embodiments, a method and/or includes deploying the one or more mock workers 104 in the one or more regional data centers 88 to test the test application based on the test design. In embodiments, the method includes deploying the one or more mock workers [102 and/or 110] in the one or more central data center 86 to test a test application based on the test design.

In embodiments, the one or more test wireless network services (e.g. radio access network 91, transport network 89, and/or core network 87) is deployed in the one or more of at least one group center 90, at least one regional data center 88, and/or at least one central data center 86. The defined one or more slices [100, 101, 103, 105, 107, and/or 109] of the wireless communication network 24 may include at least portions one or more of the at least one group center 90, the at least one regional data center 88, and/or the at least one central data center 86.

Embodiments relate to a system. In embodiments, the system may include operating units (e.g. virtual or physical) which implement methods of various embodiments. Those skilled in the art appreciate that various hardware and/or software may be implemented in a variety of ways appreciated by those skilled in the art in the spirit of the embodiments. The system may include one or more data centers [86, 88, and/or 90] configured to simulate at least one component (e.g. mock workers [102, 104, 106, 108, 110, 112, 114, and/or 116]) of the defined one or more slices [100, 101, 103, 105, 107, and/or 109] of the wireless communication network 24 to test a test application. In embodiments, the simulating the at least one component (e.g. mock workers [102, 104, 106, 108, 110, 112, 114, and/or 116]) of the defined one or more slices [100, 101, 103, 105, 107, and/or 109] of the wireless communication network 24 includes communication with the one or more test wireless communication service (e.g. radio access network 91, transport network 89, and/or core network 87).

Example FIG. 10 illustrates a schematic of an example of a cloud computing node, in accordance with embodiments. Cloud computing node 1200 is only one example of a suitable cloud computing node and is not intended to suggest any limitation as to the scope of use or functionality of embodiments described herein. Regardless, cloud computing node 1200 is capable of being implemented and/or performing any of the functionality set forth hereinabove. The term processing node is a logical concept. Any number of central processing units with any number of cores or machines can be in a single processing node.

In cloud computing node 1200 there is a computer system/server 1202, which is operational with numerous other general purpose or special purpose computing system environments or configurations. Examples of well-known computing systems, environments, and/or configurations that may be suitable for use with computer system/server 1202 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1202 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1202 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 1202 in cloud computing node 1200 is shown in the form of a general-purpose computing device. The components of computer system/server 1202 may include, but are not limited to, one or more processors or processing units 1204, a system memory 1206, and a bus 1208 that couples various system components including system memory 1206 to processor 1204.

Bus 1208 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1202 typically includes a variety of computer system readable media. Such media may be any available media that is accessible by computer system/server 1002, and it includes both volatile and non-volatile media, removable and non-removable media.

The system memory 1206 can include computer system readable media in the form of volatile memory, such as random access memory (RANI) 1210 and/or cache memory 1212. Computer system/server 1202 may further include other removable/non-removable, volatile/non-volatile computer system storage media. By way of example only, storage system 1214 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1208 by one or more data media interfaces. As will be further depicted and described below, memory 1206 may include at least one program product having a set (e.g., at least one) of program modules that are configured to carry out the functions of various embodiments of the invention.

Program/utility 1216, having a set (at least one) of program modules 1218, may be stored in memory 1206 by way of example, and not limitation, as well as an operating system, one or more application programs, other program modules, and program data. Each of the operating system, one or more application programs, other program modules, and program data or some combination thereof, may include an implementation of a networking environment. Program modules 1218 generally carry out the functions and/or methodologies of various embodiments of the invention as described herein.

Computer system/server 1202 may also communicate with one or more external devices 1020 such as a keyboard, a pointing device, a display 1222, etc.; one or more devices that enable a user to interact with computer system/server 1202; and/or any devices (e.g., network card, modem, etc.) that enable computer system/server 1202 to communicate with one or more other computing devices. Such communication can occur via I/O interfaces 1224. Still yet, computer system/server 1202 can communicate with one or more networks such as a local area network (LAN), a general wide area network (WAN), and/or a public network (e.g., the Internet) via network adapter 1226. As depicted, network adapter 1226 communicates with the other components of computer system/server 1202 via bus 1208. It should be understood that although not shown, other hardware and/or software components could be used in conjunction with computer system/server 1202. Examples, include, but are not limited to: microcode, device drivers, redundant processing units, external disk drive arrays, RAID systems, tape drives, and data archival storage systems, etc.

Example FIG. 11 illustrates cloud computing environment 1302, in accordance with embodiments. As shown, cloud computing environment 1302 comprises one or more cloud computing nodes 1200 with which local computing devices used by cloud consumers, such as, for example, personal digital assistant (PDA) or cellular telephone 1304, desktop computer 1306, laptop computer 1308, and/or automobile computer system 1310 may communicate. Nodes 1200 may communicate with one another. They may be grouped (not shown) physically or virtually, in one or more networks, such as Private, Community, Public, or Hybrid clouds as described hereinabove, or a combination thereof. This allows cloud computing environment 1302 to offer infrastructure, platforms and/or software as services for which a cloud consumer does not need to maintain resources on a local computing device. It is understood that the types of computing devices 1304, 1306, 1308, 1310 shown in FIG. 11 are intended to be illustrative only and that computing nodes 1200 and cloud computing environment 1302 can communicate with any type of computerized device over any type of network and/or network addressable connection (e.g., using a web browser).

Example FIG. 12 illustrates a set of functional abstraction layers provided by cloud computing environment 1302 (FIG. 11), in accordance with embodiments. It should be understood in advance that the components, layers, and functions shown in FIG. 12 are intended to be illustrative only and embodiments are not limited thereto. As depicted, the following layers and corresponding functions are provided:

Hardware and software layer 1402 includes hardware and software components. Examples of hardware components include mainframes; RISC (Reduced Instruction Set Computer) architecture based servers; storage devices; networks and networking components. Examples of software components include network application server software and database software.

Virtualization layer 1404 provides an abstraction layer from which the following examples of virtual entities may be provided: virtual servers; virtual storage; virtual networks, including virtual private networks; virtual applications and operating systems; and virtual clients. In one example, management layer 1406 may provide the functions of processing unit 68. Workloads layer 1408 provides examples of functionality for which the cloud computing environment may be utilized.

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It will be obvious and apparent to those skilled in the art that various modifications and variations can be made in the embodiments disclosed. This, it is intended that the disclosed embodiments cover the obvious and apparent modifications and variations, provided that they are within the scope of the appended claims and their equivalents.

What is claimed is:

1. A method comprising:
receiving a test application to be tested on a wireless communication network;
obtaining a test design for the test application, wherein the test design comprises at least one performance parameter;
defining at least one slice of the wireless communication network to test the test application based on the test design, wherein the at least one slice of the wireless communication network spans portions of at least one test wireless network service, at least one central data center, at least one regional data center, and at least one group center; and
performing at least one performance test on the at least one slice of the wireless communication network for the test application based on the at least one performance parameter.

2. The method of claim 1, wherein the at least one performance test comprises testing for faults in the wireless communication network.

3. The method of claim 2, wherein the testing for the faults in the wireless communication network comprises testing for communication failures.

4. The method of claim 2, wherein the testing for the faults in the wireless communication network comprises testing for configuration errors.

5. The method of claim 1, wherein the at least one performance test comprises testing for stress on the wireless communication network.

6. The method of claim 5, wherein the testing for stress on the wireless communication network comprises testing communication capacity effects on the wireless communication network by the test application when scaling up implementation of the test application on the wireless communication network.

7. The method of claim 5, wherein the testing for stress on the wireless communication network comprising testing computational capacity effects on the wireless communication network by the test application.

8. The method of claim 1, wherein the defining the at least one slice of the wireless communication network is defined based on the at least one performance parameter.

9. The method of claim 1, wherein:
the at least one test wireless network service comprises at least one test virtual radio access network;
the test application is a test user application;
the at least one test virtual radio access network is deployed in the at least one group center; and
the method comprises simulating at least one user equipment to test the test user application in the at least one group center.

10. The method of claim 9, wherein the at least one performance test comprises testing for at least one of faults and stress in the at least one group center by the at least one simulated user equipment.

11. The method of claim 1, wherein:
the at least one test wireless network service is deployed by the at least one regional data center.

12. The method of claim 11, wherein the at least one performance test comprises testing for at least one of faults and stress in the at least one regional data center when deploying the at least one test wireless network service.

13. The method of claim 1, wherein:
the at least one test wireless network service is deployed by the at least one central data center.

14. The method of claim 13, wherein the at least one performance test comprises testing for at least one of faults and stress in the at least one central data center when managing the at least one regional data center.

15. The method of claim 1, wherein the at least one performance parameter comprises at least one of:
network configurations;
network capacity;
threshold parameters; and
benchmarks.

16. The method of claim 1, wherein the wireless communication network is deployed as a network-as-a-service.

17. The method of claim 1, wherein the test application is at least one of:
a virtualized distributed unit user application;
a virtualized central unit user application;
an internet-of-things user application;
a drone service application;
a mobile virtual network operator user application;
a mail user application; and
a messaging user application.

18. The method of claim 1, further comprising:
controlling the at least one slice of the wireless communication network to test the test application; and
deploying the at least one test wireless network service to test the test application.

19. The method of claim 1, wherein:
the at least one test wireless network service comprises a plurality of wireless network services; and
the test design comprises a plurality of implementations in parallel at the plurality of wireless network services such that the performing of the at least one performance test tests at least one of faults and stress on the at least one slice of the wireless communication network by the test application.

20. A system comprising:
a memory storing instructions;
a processor communicatively coupled to the memory and configured to execute the instructions to:
receive a test application to be tested on a wireless communication network and obtain a test design for the test application, wherein the test design comprises at least one performance parameter;
define at least one slice of the wireless communication network to test the test application based on the test design, wherein the at least one slice of the wireless communication network spans portions of at least one test wireless network service, at least one central data center, at least one regional data center, and at least one group center; and
simulate at least one component of the at least one slice of the wireless communication network to test the test application, wherein the simulating the at least one component of the at least one slice of the wireless communication network comprises communication with the at least one test wireless network service based on the at least one performance parameter.

* * * * *